United States Patent [19]

d'Almada Remedios et al.

[11] Patent Number: 4,836,602
[45] Date of Patent: Jun. 6, 1989

[54] APPARATUS FOR STORING FOOD AND BEVERAGES IN A PASSENGER SEATBACK

[75] Inventors: Miguel A. d'Almada Remedios, Bothell; Thomas R. Riedinger, Mercer Island, both of Wash.

[73] Assignee: The Boeing Company, Seattle, Wash.

[21] Appl. No.: 248,503

[22] Filed: Sep. 23, 1988

[51] Int. Cl.[4] .............................................. A47C 7/62
[52] U.S. Cl. ..................... 297/191; 297/146; 297/188; 312/242
[58] Field of Search ............... 297/191, 188, 146, 217; 244/118.6; 312/242, 246, 248

[56] References Cited

U.S. PATENT DOCUMENTS

| 202,539 | 12/1935 | Kupfer | 297/191 |
|---|---|---|---|
| 2,136,407 | 11/1938 | Armour | 297/191 |
| 2,311,968 | 2/1943 | Schallis | 312/248 X |
| 2,358,071 | 12/1944 | Hurtado . | |
| 2,383,125 | 8/1945 | Hill | 297/191 |
| 2,525,952 | 2/1948 | Saterlie et al. . | |
| 2,906,578 | 9/1959 | Sessions | 312/242 |
| 3,019,050 | 1/1962 | Spielman | 297/191 |
| 3,049,374 | 8/1962 | Nance | 297/146 |
| 3,172,713 | 3/1965 | Rupert | 312/235 R |
| 3,449,011 | 6/1969 | Edwards et al. | 297/391 |
| 3,586,099 | 6/1971 | Collie | 297/180 X |
| 3,596,987 | 8/1971 | Wilson | 297/191 |
| 3,615,118 | 10/1971 | Buxton | 297/191 |
| 3,762,790 | 10/1973 | Neuwirth | 312/248 X |
| 3,997,220 | 12/1976 | Mayer | 312/242 |
| 4,157,853 | 6/1979 | Carey | 312/242 X |
| 4,300,248 | 11/1981 | Dworkin | 312/242 X |
| 4,630,821 | 12/1986 | Greenwald | 297/191 X |

FOREIGN PATENT DOCUMENTS

| 2413422 | 10/1974 | Fed. Rep. of Germany | 291/191 |
|---|---|---|---|
| 261199 | 11/1926 | United Kingdom | 297/146 |

Primary Examiner—James T. McCall
Attorney, Agent, or Firm—Robert H. Sproule; B. A. Donahue

[57] ABSTRACT

A container assembly secured in the back of a passenger seat contains food and beverage for a passenger sitting behind the seatback. The container includes an rounded portion which holds a beverage can and glass. The container is held by a holder assembly which is fastened to a recessed area inside the seat. The container is secured to the holder by first inserting the rounded portion of the container into a similarly rounded portion of the holder and then rotating the container into an interference fit with the holder.

2 Claims, 3 Drawing Sheets

APPARATUS FOR STORING FOOD AND BEVERAGES IN A PASSENGER SEATBACK

TECHNICAL FIELD

The present invention pertains to apparatus for storing food and beverages in the back of an aircraft seat for use by a passenger sitting behind the seat.

BACKGROUND OF THE INVENTION

Presently aboard commercial aircraft, food and beverages are served by flight attendants from a cart which is moved along the central aisle or aisles of the aircraft. On short flights, it is sometimes difficult to serve all of the passengers in this manner due to a lack of time. It is desirable, therefore, to provide some means for allowing the passengers to obtain food and beverages without having to leave their seats.

A number of apparatus have been disclosed for providing food and beverages from a dispenser located near a passenger's seat. For example, in U.S. Pat. No. 3,615,118 by Buxton there is described a compartment located inside an aircraft seatback for storing prepackaged food.

Similarly, Nance in U.S. Pat. No. 3,049,374 describes a food container which is stored in an aircraft seatback and which swings downward and rearward from the seatback for access by a passenger sitting behind the seat.

SUMMARY OF THE INVENTION

The present invention pertains to apparatus for storing material, such as food and beverage, in the back of a seat. The apparatus includes a container for the material. The container has (i) a lower upwardly extending wall having an upper end and a lower end, (ii) a rounded portion which is formed by a semicircular wall which is attached to the upper end of the lower wall, and (iii) a horizontal segment which extends from an upper end of the semicircular wall.

There is also provided a holder for the container. The holder is fastened to the seatback and it removably engages the container. The holder includes (i) a lower upwardly extending wall having an upper end and a lower end, (ii) a rounded portion which is formed by a semicircular wall which is attached to the upper end of the holder lower wall, (iii) a horizontal segment which extends from an upper end of the holder semicircular wall, and (iv) a downwardly extending lip portion which is attached to an end of the holder horizontal segment.

In the present invention when the rounded portion of the container is inserted within the rounded portion of the holder and the lower wall of the container is moved to a position which is adjacent to the lower wall of the holder, the container is caused to rotate to a position in which the end of the container horizontal segment engages the lip of the holder such that the container is held in an interference fit.

BRIEF DESCRIPTION OF THE DRAWINGS

The present invention will be described in greater detail in the following detailed description in conjunction with the attached drawings, in which.

DETAILED DESCRIPTION OF THE INVENTION

The present invention pertains to a food and beverage storage container which is located in the back of a seat for use by a person sitting behind the seat. In an exemplary embodiment the storage container is located in the back of a commercial aircraft seat.

Figure 1:
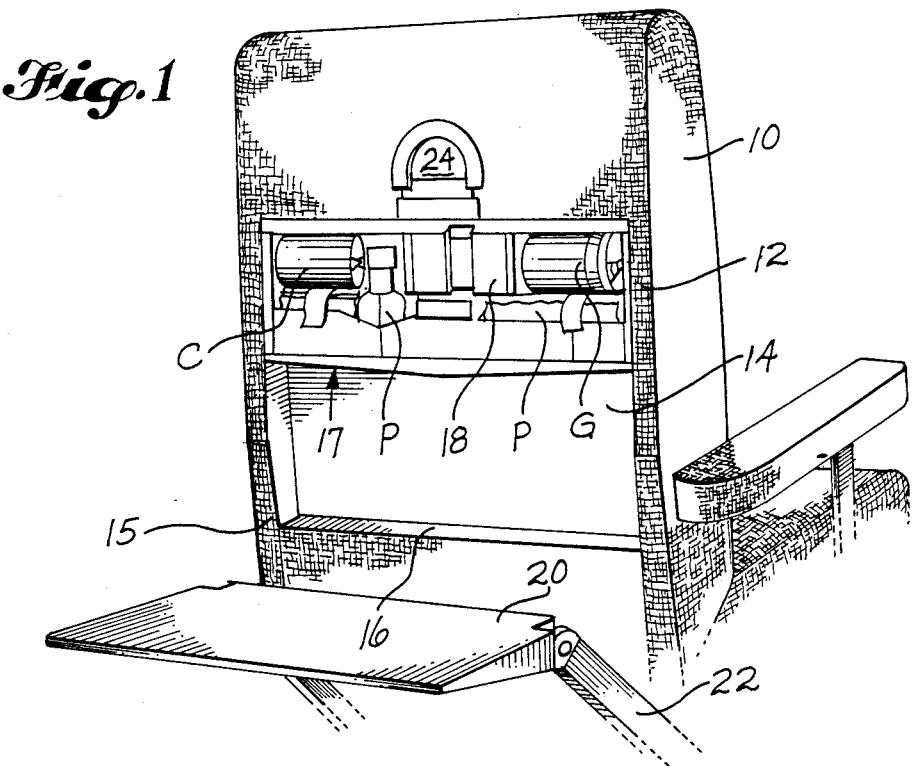
FIG. 1 is an isometric view of a commercial airplane seatback which is exposed to show the container of the present invention.

Referring first to FIG. 1 there is shown a seat 10 having a back portion 12 in which there is located a recessed opening 14 formed by left, right vertical side panels 15 and upper, lower horizontal panels 16. Positioned inside the recessed opening 14 is a plastic container assembly indicated at 17 which contains a cylindrical beverage container C, a liquids dispenser 18, a cylindrical glass G, and various dry food packages P. In the present embodiment, the seatback opening is covered by a conventional tray table 20 which is attached to a lower portion of the seat by parallel arms 22. When the tray table 20 is not in use, it is pivoted from the horizontal position shown in FIG. 1 to a vertical position (not shown) in order to cover the seatback opening and the container assembly therein. The tray table 20 is held in the vertical position by a latch 24.

Figure 2:
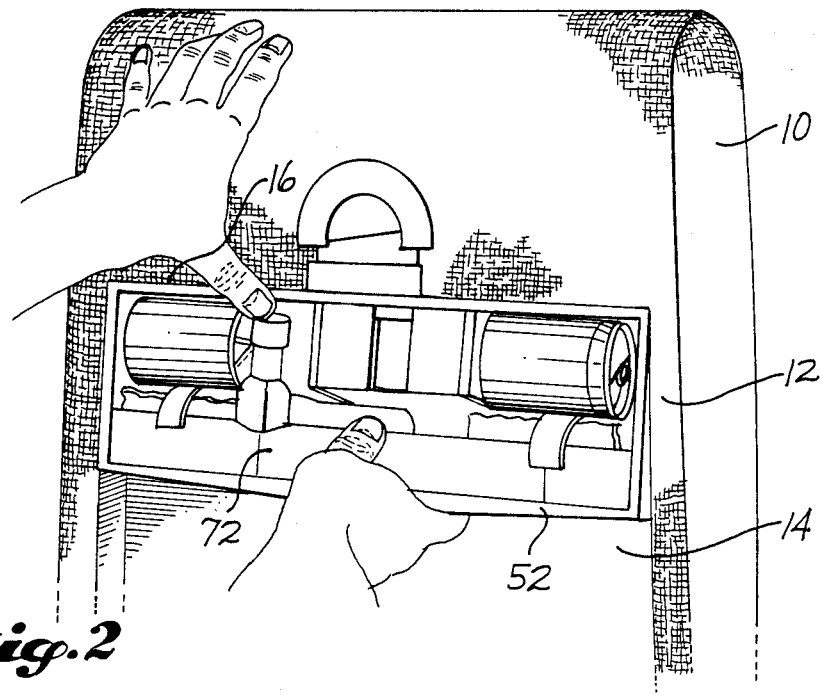
FIG. 2 is an isometric view showing the container being removed from a holder.
Figure 3:
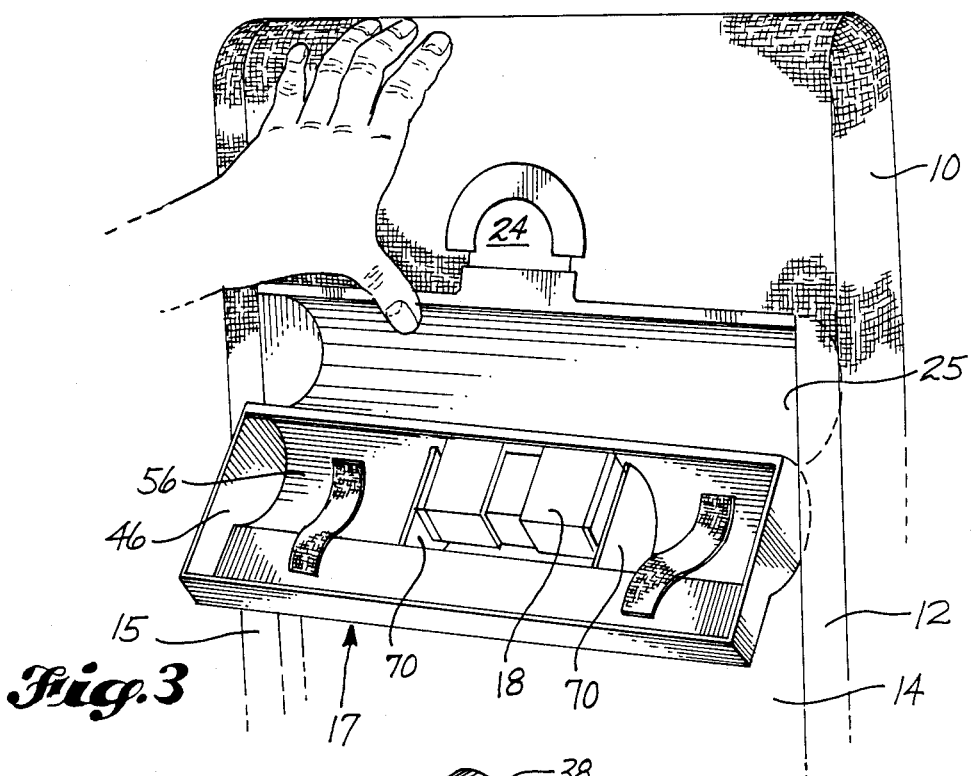
FIG. 3 is an isometric view in which the container has been removed from the holder.

As shown more clearly in FIGS. 2 and 3, in order to remove the storage container 17 from the seatback opening, a lower portion of the container assembly is pulled rearward thereby rotating and disengaging an upper portion of the container assembly from a holder assembly 25 (FIG. 3) located in the seatback opening. Reinstallation of the container assembly is accomplished by first inserting the upper portion of the container assembly 17 in the holder assembly 25, and then pushing the lower portion of the container assembly forward into the holder assembly. The container and holder assemblies are typically made from a somewhat flexible plastic material.

Figure 4:
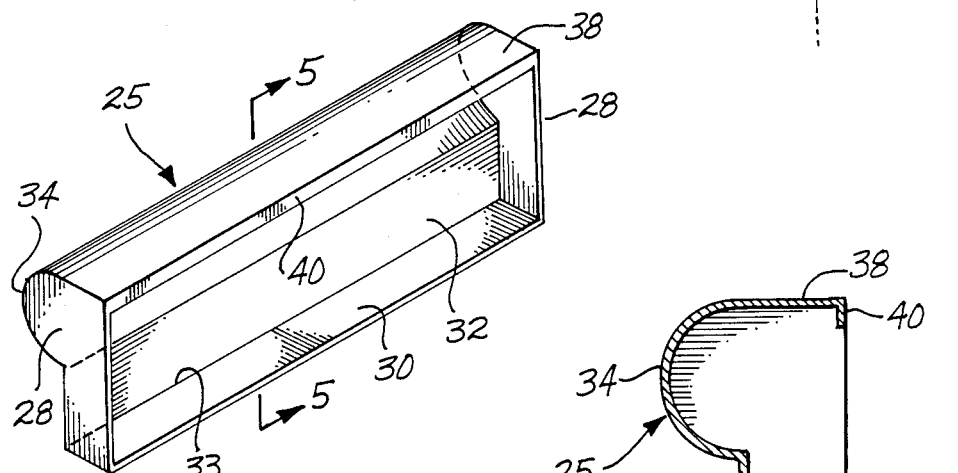
FIG. 4 is an isometric view of the holder.
Figure 5:
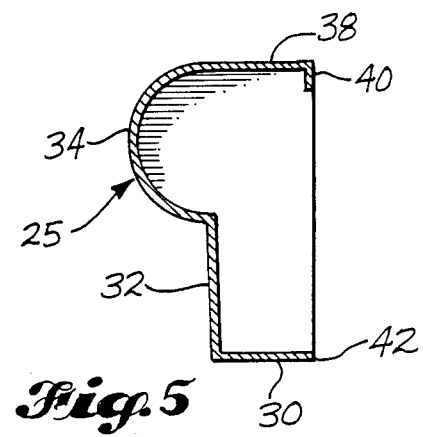
FIG. 5 is sectional view of the holder taken along line 5—5 of FIG. 4.

As shown in FIGS. 4 and 5, the holder assembly 25 includes vertical sidewalls 28 which are fastened to the inner side panels 15 (FIG. 1) of the seatback opening. Extending between the sidewalls 28 is the body of the holder which includes a lower horizontal floor 30 to which there is attached an upwardly extending forward wall 32 at a forward end 33 of the floor 30. The top of the forward wall 32 is integrally attached to a bottom of a semiconductor wall 34 which extends upward and forward through an angle of about ninety degrees and then upward and rearward for an additional ninety degrees terminating along an imaginary line which is vertically aligned with the forward wall 32. Extending from the semicircular wall 34 rearward of this imaginary line is an upper horizontal member 38 which terminates at a downward extending lip 40 which, in turn, is directly above a rear end 42 of the floor 30. In the present embodiment, the holder 25 is secured within the opening 14 (FIG. 3) by conventional fasteners (not shown) so that the upper horizontal member 38 is mounted flush against the upper horizontal panel 16 of the seatback opening.

Figure 6:
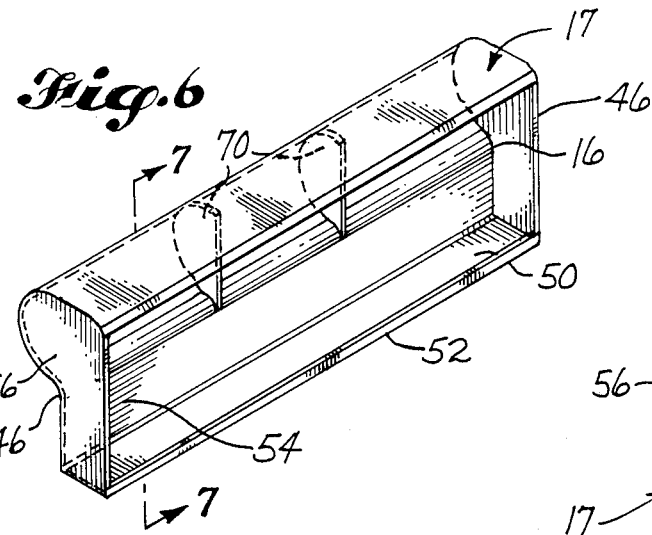
FIG. 6 is an isometric view of the container.
Figure 7:
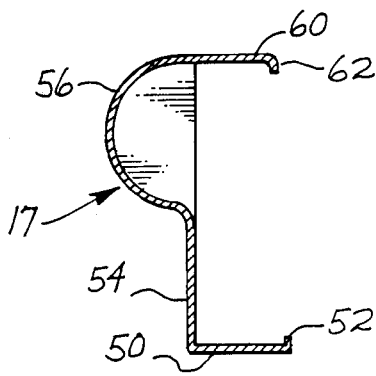
FIG. 7 is a sectional view of the container taken along line 7—7 of FIG. 6.

With regard to the container assembly 17, reference is made to FIGS. 6 and 7. The container assembly 17 includes left, right sidewalls 46 which engage the sidewalls 28 of the holder 25 when the container assembly is installed. Extending between the left, right sidewalls 46 is a lower horizontal floor 50 having an upwardly extending lip 52 at its rear end and an upwardly extending wall 54 at its forward end. The top of the forward wall 54 is integrally attached to a semicircular wall 56 which curves forward and upward through about ninety degrees and then rearward and upward through an additional ninety degrees where it terminates at an imaginary line which is vertically aligned with the lower wall 54. Extending rearward from the semicircular wall at the imaginary line is an upper horizontal segment 60 which terminates at its rear end at a lip 62 which is directly above the upwardly extending lip 52. As shown in FIG. 7, the container lip 62 curves downward and rearward from the horizontal segment 60.

Figure 8:
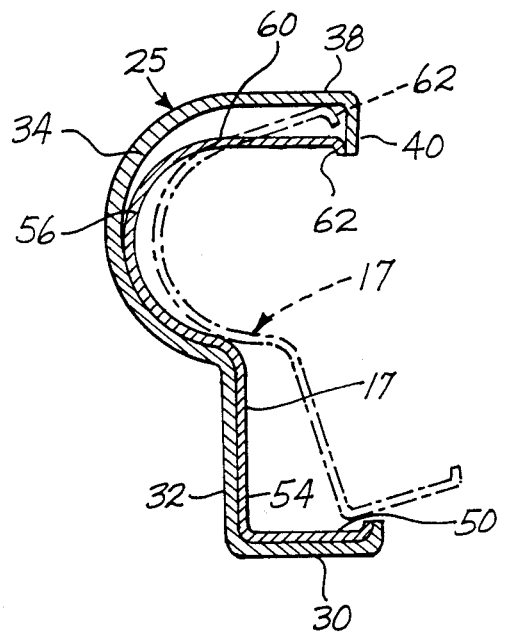
FIG. 8 is a sectional side view showing partial insertion of the container into the holder in phantom lines, and full insertion of the container into the holder in solid lines.

As should be apparent, the shape and size of the container 17 is similar to the shape and size of the holder 25. However as shown in FIG. 8, the container 17 has a somewhat smaller vertical dimension than the holder 25. In addition, the upper lip 40 of the holder is not only vertical, but it has a larger vertical dimension than the upper lip 62 of the container. This allows the rounded upper portion of the container body to be first inserted within the rounded upper portion of the holder, and then rotated in a clockwise direction (as seen in FIG. 8). Upon insertion of the upper portion of the container 17 inside the holder 25, the container is tilted at an angle of about thirty degrees as shown in phantom in FIG. 8. In this manner the upper lip 62 of the container is adjacent to the upper horizontal segment 38 of the holder. Then when the lower portion of the container body is moved forward, the rounded forward wall 56 of the container rides upward on the rounded forward wall 34 of the holder, causing the container lip 62 to rotate downward and into engagement with the lip 40 of the holder. In this manner, the upper portion of the container is held in an interference fit between the holder lip 40 and the holder semicircular wall 34. Furthermore, the container floor 50 is supported by the floor 30 of the holder. In an exemplary embodiment, the forward wall of the container is held against the forward wall of the holder by one or more hook and loop fasteners (not shown).

Located inside the container 17 are the food and beverages. As shown in FIG. 1, the cylindrical beverage can C and cylindrical glass G are located in the rounded portion of the container and separated by the liquid dispenser 18. In this manner, the rounded wall 56 (FIG. 3) of the container serve to hold the beverage can and glass while at the same time helping to secure the container 17 to the holder 25. The liquid dispenser 18 is held in an interference fit between two walls 70 (FIGS. 1 and 6). Likewise, the beverage can C is held in an interference fit between the left wall 70 and the left sidewall 46 of the container, while the beverage glass G is held in an interference fit between the right wall 70 and the right sidewall 46 of the container.

In order to hold the packaged material P, the container includes a number of drawers 72 (FIG. 2) which are removably secured between the lower lip 52 and forward wall 54 of the container.

What is claimed is:

1. Apparatus for storing material in a back of a seat, the apparatus comprising:
   a. a container for the material, the container including (i) a lower upwardly extending wall having an upper end and a lower end, (ii) a rounded portion which is formed by a rounded wall which is attached to the upper end of the lower wall at an lower end of the rounded wall, (iii) a horizontal segment having a first end, which is attached to an upper end of the rounded wall, and a second end; and
   b. a holder which is fastened to the seatback and which removably engages the container, the holder including (i) a lower upwardly extending wall having an upper end and a lower end, (ii) a rounded portion which is formed by a rounded wall which is attached to the upper end of the lower wall at a lower end of the holder rounded wall, (iii) a horizontal segment having a first end which is attached to an upper end of the rounded wall, and a second end; and (iv) a downwardly extending lip portion which is attached to the second end of the holder horizontal segment in a manner that when the rounded portion of the container is inserted within the rounded portion of the holder and the lower wall of the container is moved adjacent to the lower wall of the holder, the container is caused to rotate so that the second end of the container horizontal segment engages the lip of the holder such that the container is held in an interference fit between the rounded portion of the holder and the lip of the holder.

2. The apparatus as set forth in claim 1 wherein:
   a. the lower end of the container lower wall has a lower horizontal segment attached thereto;
   b. the lower end of the holder lower wall has a lower horizontal segment attached thereto; and
   c. When the container lower wall is adjacent to the holder lower wall, the lower horizontal segment of the container is supported on the lower horizontal segment of the holder.

* * * * *